US008839125B2

(12) United States Patent
Ballard et al.

(10) Patent No.: US 8,839,125 B2
(45) Date of Patent: Sep. 16, 2014

(54) ALTERNATE POWER UP INVENTORY METHODS FOR STORAGE APPARATUS

(75) Inventors: Curtis C. Ballard, Eaton, CO (US); Kelly J. Reasoner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 11/259,217

(22) Filed: Oct. 26, 2005

(65) Prior Publication Data

US 2007/0093938 A1 Apr. 26, 2007

(51) Int. Cl.
*G06F 3/048* (2013.01)
*G06F 17/30* (2006.01)
*G06F 9/00* (2006.01)
*G06F 11/14* (2006.01)
*G06F 9/44* (2006.01)

(52) U.S. Cl.
CPC .......... *G06F 11/1458* (2013.01); *G06F 9/4406* (2013.01); *Y10S 707/99955* (2013.01)
USPC ......................... 715/764; 707/999.204; 713/2

(58) Field of Classification Search
CPC ............................ G06F 11/1458; G06F 9/4406
USPC ................. 707/204, 999.204; 715/764; 713/2
See application file for complete search history.

(56) References Cited

U.S. PATENT DOCUMENTS

| 7,146,387 | B1 * | 12/2006 | Russo et al. | 707/204 |
| 7,228,405 | B2 * | 6/2007 | Rothman et al. | 713/1 |
| 2004/0093361 | A1 * | 5/2004 | Therrien et al. | 707/204 |
| 2005/0228835 | A1 * | 10/2005 | Roa | 707/204 |

OTHER PUBLICATIONS

Quantum P4000 and P7000 User's Guide Ver.4 Rel. 0 Mar. 2004.*
Quantum ATL P4000 and ATL P7000 Prism FC470 user's guide addendum, Jul. 2003, p. 1, p. 7.*

* cited by examiner

*Primary Examiner* — Haoshian Shih

(57) ABSTRACT

Storage apparatus and related methods for inventorying removable media. A controller is configured to robotically manage the removable media and to inventory the media after power-up using a default inventory method. An operator control panel is coupled to the controller and is configurable to solicit one of a number of alternate inventory methods from a user during power-up. Various user interfaces may be provided including a graphical user interface, a web interface and a command line interface. Password security may be provided that is a function of the risk an operator is required to assume when choosing a particular mode.

19 Claims, 4 Drawing Sheets

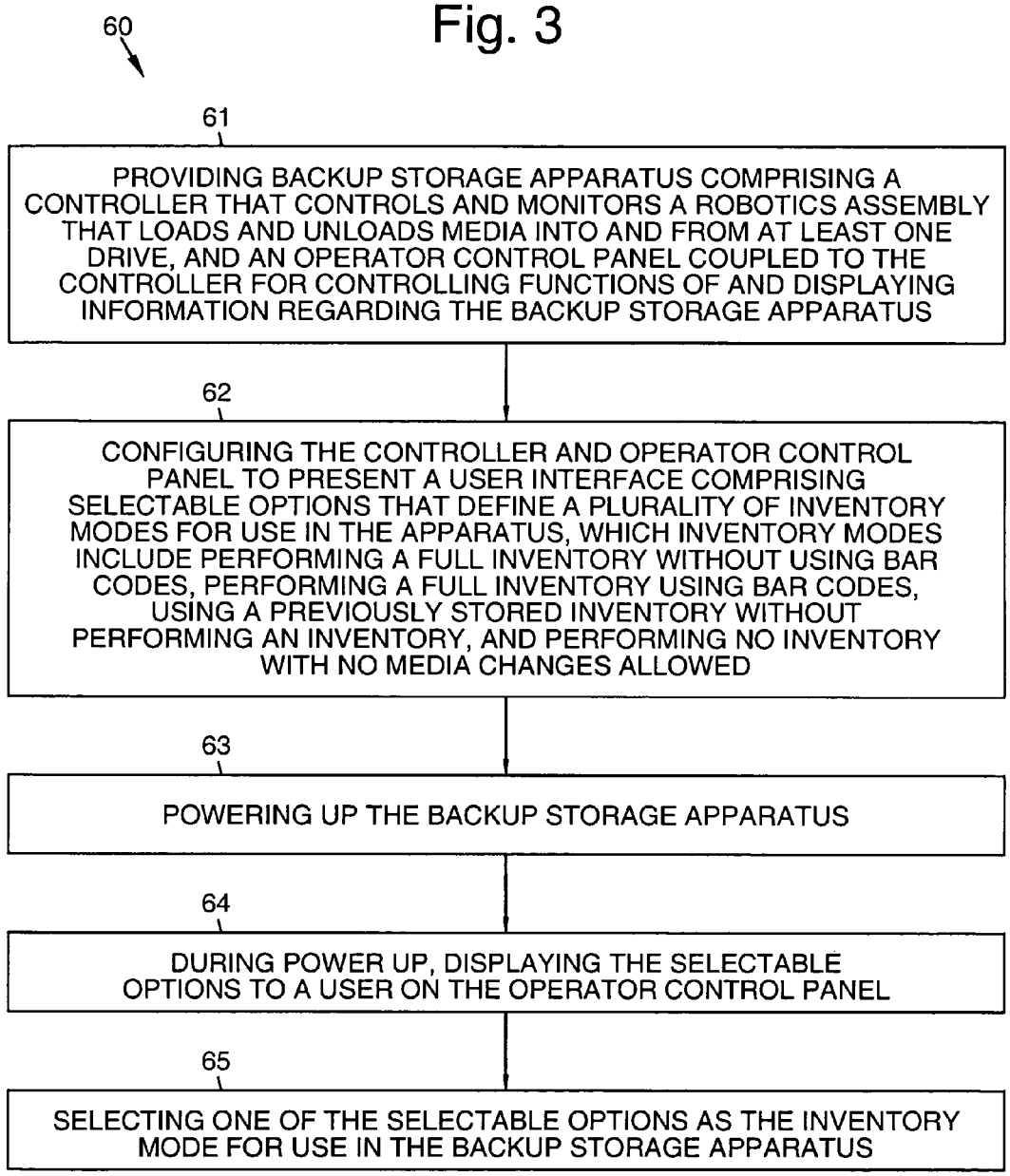

ALTERNATE POWER UP INVENTORY METHODS FOR STORAGE APPARATUS

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a StorageWorks brand of tape libraries are manufactured in various sizes and configurations. The number of tape cartridges that can be loaded into such tape libraries varies depending upon model, but may be on the order of 400-500 tapes, for example.

A typical tape library usually has a control and display panel (or operator control panel) where local functions are controlled and where the health of the tape library may be displayed. The display typically presents information about components in the tape library that are built by the original library manufacturer. Value added components may also be installed in the tape library including software tools to aid in the configuration, installation, and management of the tape library.

Tape libraries inventory the media in the library at power up and are not ready for operation until the inventory is complete. With large libraries, it can take a long time to inventory, which is sometimes inconvenient. The inventory process for a tape library containing 400-500 tapes, for example, can take up to 60 minutes to complete. If restrictions are imposed on the operating modes that can be used by the customer, this may cause customer dissatisfaction and may cause loss of sales if the customer is not willing to accept those requirements.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 3 is a flow diagram that illustrates an exemplary inventory selection method for use with backup storage devices.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other storage devices and systems, including optical drives and hard disk drives, for example.

Figure 1:
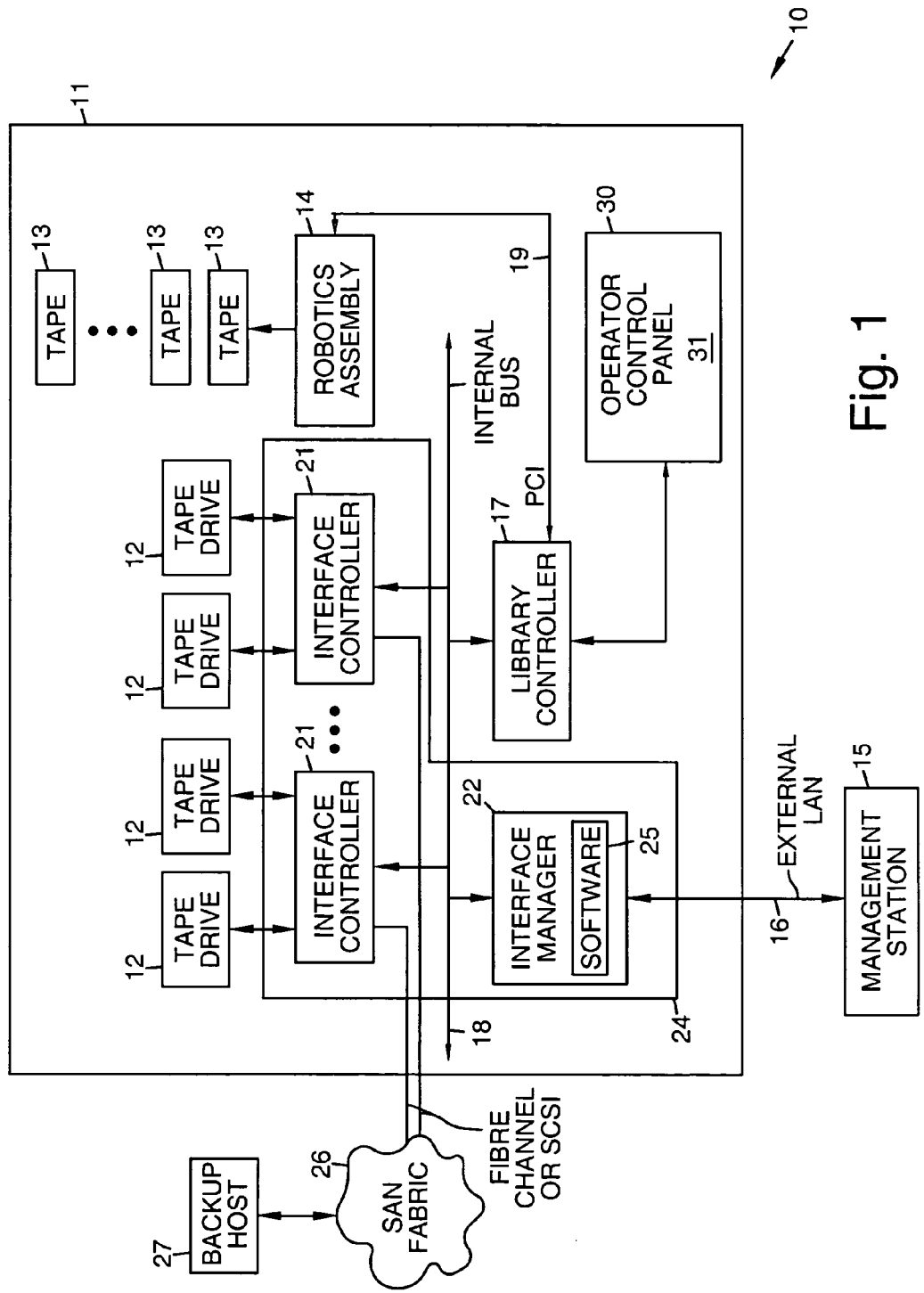
FIG. 1 is a block diagram that illustrates an exemplary tape library.

Referring to the drawing figures, FIG. 1 shows exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage device 12 might comprise an optical disk reader used with optical disk media, or removable hard disk drives, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal bus 18 comprising a communication link 18.

One or more interface controllers 21 may be coupled between selected tape drives 12 and the internal bus 18. The interface controllers 21 provide a communication path for the interface manager 22 to talk to the tape drives 12. The interface controllers 21 also provide a controlled data path between the tape drives 12 and a backup server 27. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 26, but this is not commonly used in current-generation computers.

The interface manager 22 or management appliance 22 and the interface controllers 21 comprise the value added components 24 of the tape library 10, i.e., components that may not be manufactured and installed by the original library manufacturer.

A library controller 17 is coupled by way of the internal bus 18 (communication link 18) to the one or more interface controllers 21 and to the interface manager 22 or management appliance 22. The library controller 17 is also coupled by the way of a private internal bus such as a PCI bus 19 to the robotics assembly 14.

The tape library 10 comprises an operator control panel and display system 30, referred to as an operator control panel 30, which is preferably disposed on a front panel of the tape library 10, for ease of use. The operator control panel 30 controls local functions and displays information regarding the tape library 10. The operator control panel 30 presents information about components in the tape library 10.

The operator control panel 30 comprises a graphical user interface (GUI) 31 that displays library status information and allows a user to access the library menus. These menus allow a user to view or change the library settings, run demonstration programs, and run diagnostic tests, for example. Certain of these menus are illustrated in and are discussed with reference to FIGS. 2a-2d.

The operator control panel 30 is configured to provide easy and quick navigation to pertinent levels of information relating to inventory modes 33. This solution minimizes the amount of information that the user is required to evaluate to perform this function.

Figure 2A:
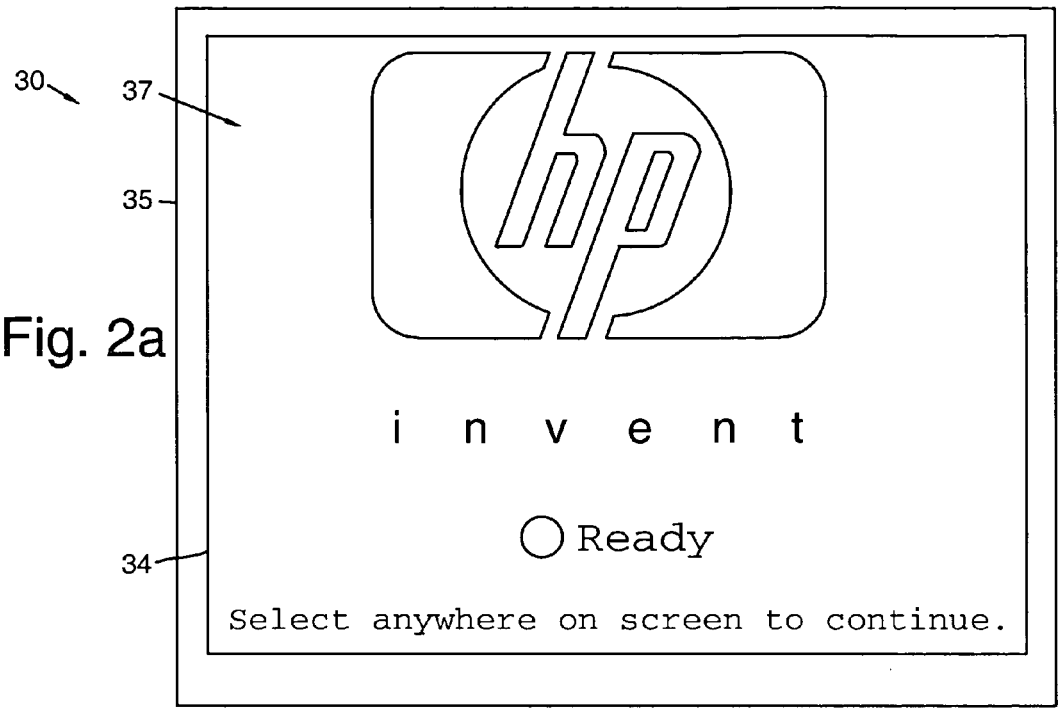
FIGS. 2a-2d illustrate exemplary display screens of an exemplary inventory mode function for use in backup storage or other device.
Figure 2B:
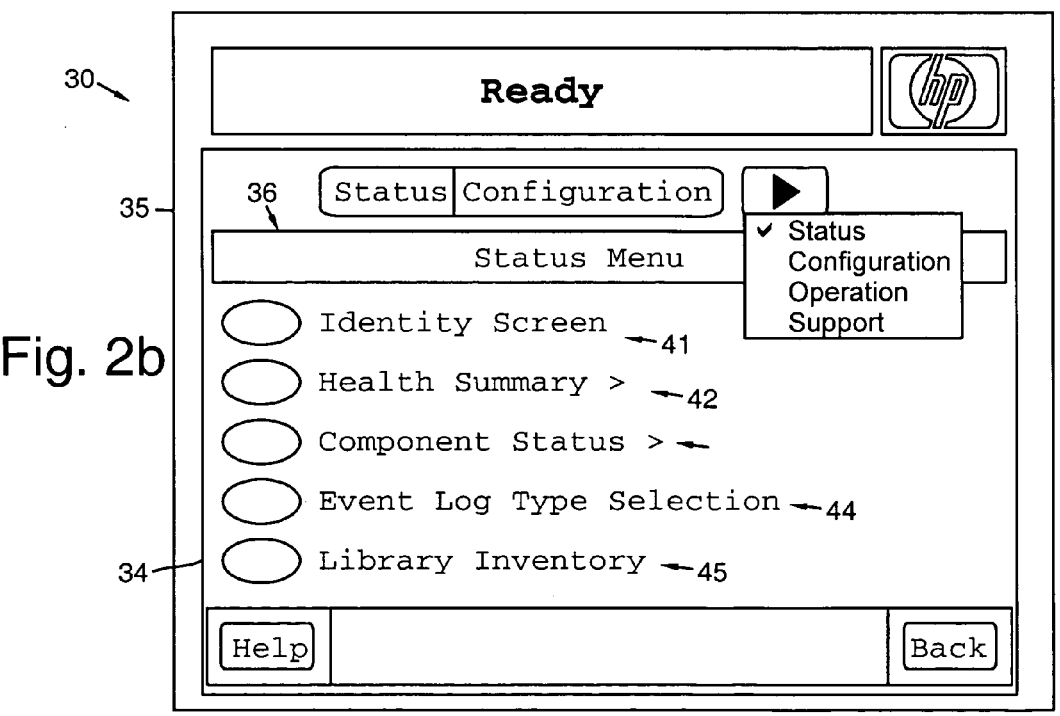
Figure 2C:
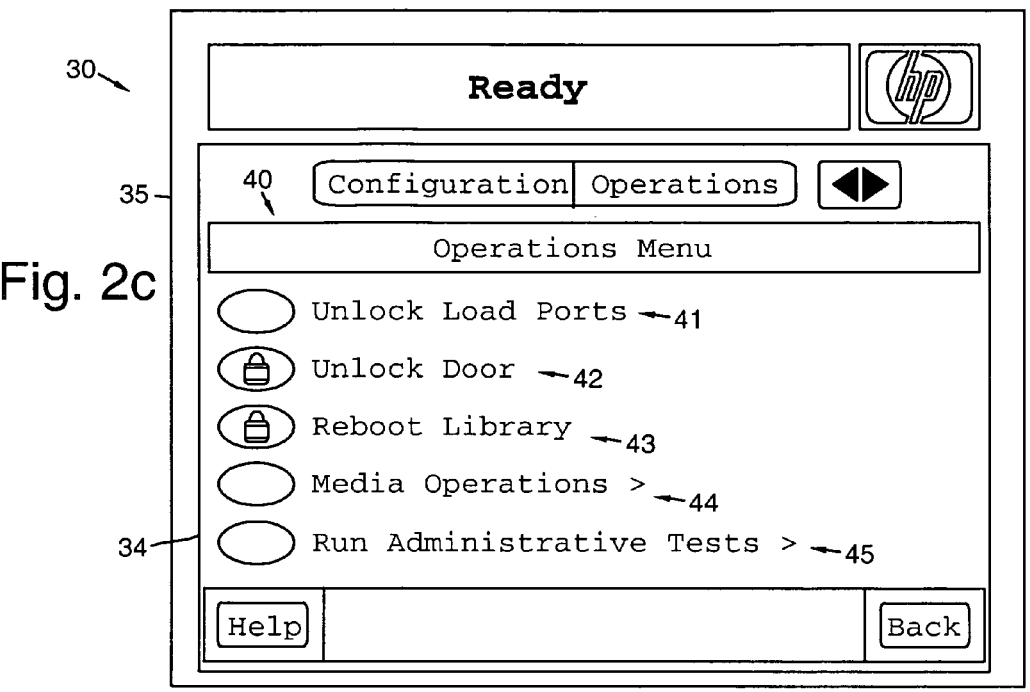
Figure 2D:
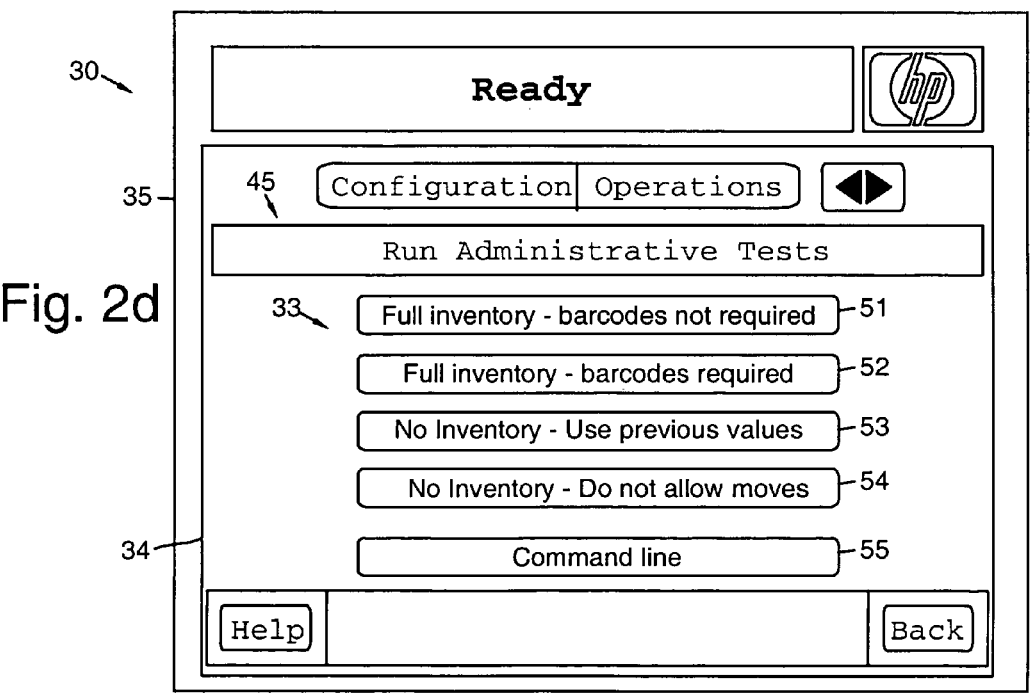

FIGS. 2a-2d show exemplary screen displays 34 that may be displayed on a reduced to practice embodiment of a backup storage device 10, such as a tape library 10, for example. Certain of the exemplary screen displays 34 specifically relate to an exemplary inventory mode function (FIGS. 2b-2d). The exemplary screen displays 34 and inventory mode function may be presented on a display screen 35 of the operator control panel 30.

The exemplary inventory mode function is implemented by way of an status menu 36 (FIG. 2b) that is one menu of a menu structure or tree. The operator control panel 30 has a menu structure that has many paths, such as is illustrated by multiple menus shown in FIGS. 2b-2d.

FIG. 2a shows an exemplary screen display 34 comprising an initial splash screen 37 showing a logo. Clicking on the screen display 34 takes the user of a subsequent screen display 34, shown in FIG. 2b.

The screen display 34 shown in FIG. 2b may be used to present Status, Configuration, Operation and Support information to the user. The user may display the information contained in the Status, Configuration, Operation and Support menus by clicking on the appropriate button at the top of the screen, or by clicking on the right pointing arrow to select one of the screens that is not yet displayed (Operation and Support screens, in this case).

FIG. 2c illustrates an exemplary Operations menu 40, which is displayed by clicking on the Operations button at the top of the display screen 35, or by migrating to this screen using the right pointing arrow shown in FIG. 2b. The Operations menu 40 shown in FIG. 2c allows the user to unlock load ports 41 of the tape library 10, unlock the door 42 of the tape library 10, reboot 43 the tape library 10, perform media operations 44, and run administrative tests 45 for example. Clicking on the run administrative tests 45 icon takes the user to the screen display 34 shown in FIG. 2d, which relates to functions relating to inventory modes 33.

Referring to FIG. 2d, a user (customer) may select from any of the following inventory modes 33 or methods 33, for example, but others may be possible as well. Thus, the options listed below do not limit the possible inventory methods 33 or modes 33. Exemplary inventory methods 33 or modes 33 include the following.

(1) Full inventory—barcodes not required 51.

With this inventory method 33, the tape library 10 performs an exhaustive inventory of every element in the library 10 and uses all possible methods to detect the presence of storage media (tapes) 13 including physically checking to see if media 13 is present.

(2) Full inventory—barcodes required 52.

With this inventory method 33, the tape library 10 performs a visual scan using a barcode reader of all the elements in the library 10, and each element where no barcode is found is marked as empty.

(3) No Inventory—Use previous values 53.

With this inventory method 33, the library 10 skips the inventory process if there is a valid inventory in memory. If no inventory is in memory, either of the previous two inventory methods 33 may be used. With this method 33 the customer may not load or unload storage media 13 through a bulk load door of the tape library 10 and can only use the load ports. The library 10 assumes that the bulk load door is never accessed when the power is turned off and ignores accesses while the tape library 10 is powered up. However, if the tape library 10 can detect bulk load door accesses, it may perform an inventory when the bulk load door is closed.

(4) No Inventory—Do not allow media changes (moves) 54.

This inventory method 33 is a special case for service use where the library 10 powers up as quickly as possible, performs mechanical calibration, and does not check inventory. This method 33 lets a service engineer to very quickly verify that mechanical aspects of the library 10 are working correctly, and lets the service engineer use the operator control panel 30 without waiting for an inventory.

The above-described procedures gives customers full flexibility to use any tape management policy they would like while still having access to performance benefits that are available when using a well-controlled tape management policy. This solution provides multiple methods 33 of inventorying a large tape library 10 to allow the user to select their operating environment and avoid unnecessary inventory time. This solution reduces power-up time significantly if the user knows that parts of the inventory process may be skipped.

It is to be understood that inventory modes other than those specifically described above may be used and the list presented is not exhaustive. For example, one exemplary inventory mode may use data from an RF sensor scan, for example, to establish the inventory. Also, and for example, varying levels of password security may apply to different inventory modes depending upon the risk the operator is required to assume when choosing those modes.

Thus, display of library status information and access to menus, including those relating to inventory modes 33 may be provided using the operator control panel 30. However, any user interface 31, such as a web interface, for example, may be used. Such a web interface may communicate with the interface manager 22 to permit remote access and control of inventory modes 33.

FIG. 3 is a flow diagram that illustrates an exemplary inventory selection method 60 or algorithm 60 for use in backup storage apparatus 10. The exemplary method 60 or algorithm 60 may be used with backup storage apparatus 10 such as magnetic tape libraries, optical drives and hard disk drives, for example. The exemplary method 60 or algorithm 60 comprises the following actions.

Backup storage apparatus 10 is provided 61 that comprises a controller 17 that controls and monitors a robotics assembly 14 that loads and unloads media 13 into and from at least one storage device 12, and an operator control panel 30 coupled to the controller 17 for controlling functions of and displaying information regarding the backup storage apparatus 10. The controller 17 and operator control panel 30 are configured 62 to present a user interface 31 on the operator control panel 30 comprising selectable options that define a plurality of inventory modes 33 that may be used in the apparatus 10. The plurality of inventory modes 33 include performing a full inventory without using bar codes 51, performing a full inventory using bar codes 52, using a previously stored inventory 53 without performing an inventory, and performing no inventory 54 with no media changes allowed. The backup storage apparatus 10 is powered up 63. During power up, the selectable options are displayed 64 to a user on the operator control panel 30. The user selects 65 one of the selectable options 51-54 as the inventory mode for use in the backup storage apparatus 10.

Thus, in summary, storage apparatus 10 containing removable media 13 has been disclosed that comprises a controller 17 configured to robotically manage the removable media 13 and to inventory the media 13 after power-up using a default inventory method. The storage apparatus 10 further comprises an operator control panel 30 coupled to the controller 17 that is configurable to solicit one of a number of alternate inventory methods from a user during power-up. Various types of interfaces may be provided including a graphical user interface, a web interface and a command line interface. Password security may be provided that is a function of the risk an operator is required to assume when choosing a particular mode.

Thus, improved storage apparatus and methods have been disclosed that provide for multiple inventory modes during power-up. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. Storage apparatus containing removable media, comprising;
    a controller configured to robotically manage the removable media and to inventory the media after power-up using a default inventory method; and
    an operator control panel coupled to the controller and configurable to solicit one of a number of alternate inventory methods from a user during power-up, the number of alternative inventory methods including
    no inventory—use previous values, which causes the controller to skip inventory processes if there is a valid inventory in memory.

2. The apparatus recited in claim 1 wherein the operator control panel comprises a user interface via a web interface.

3. The apparatus recited in claim 1 wherein the operator control panel comprises a command line interface.

4. The apparatus recited in claim 1 wherein the operator control panel implements password security that is a function of inventory mode.

5. The apparatus recited in claim 4 wherein the password security is a function of the risk an operator is required to assume when choosing a particular mode.

6. Storage apparatus containing removable media, comprising:
    controller means configured to robotically manage the removable media and to inventory the media after power-up using a default inventory method; and
    operator control panel means coupled to the controller means and configurable to solicit one of a number of alternate inventory methods from a user during power-up, the number of alternative inventory methods including
    no inventory—use previous values, which causes the controller to skip inventory processes if there is a valid inventory in memory.

7. An inventory method for use with storage apparatus containing removable media, comprising:
    configuring a controller to robotically manage the removable media and to inventory the media after power-up using a default inventory method; and
    soliciting one of a number of alternate inventory methods from a user by way of an operator control panel during power-up, the number of alternative inventory methods including
    no inventory—use previous values, which causes the controller to skip inventory processes if there is a valid inventory in memory.

8. The method recited in claim 7 wherein the Inventory methods include performing a full inventory without using bar codes, performing a full inventory using bar codes, using a previously stored inventory without performing an inventory, and performing no inventory with no media changes allowed.

9. The method recited in claim 7 wherein the operator control panel implements password security that is a function of inventory mode.

10. The method recited in claim 9 wherein the password security is a function of the risk an operator is required to assume when choosing a particular mode.

11. The method recited in claim 7 wherein soliciting one of alternate inventory methods comprises:
    powering up the backup storage apparatus; during, power up, displaying the alternate inventory methods to a user; and
    selecting one of the alternate inventory methods as the inventory method for use in the storage apparatus.

12. The apparatus recited in claim 1 further comprising a full inventory—barcodes not required method which causes the controller to perform an exhaustive inventory of every element in a library, and the controller uses all possible methods to detect presence of the removable media including physically checking to see if the removable media is present.

13. The apparatus recited in claim 1 further comprising a full inventory—barcodes required method which causes the controller to perform a visual scan using a barcode reader of all elements in a library, and each element where no barcode is found is marked as empty.

14. The apparatus recited in claim 1 further comprising one of full inventory—barcodes not required and full inventory—barcodes required is performed when no inventory is in the memory.

15. The apparatus recited in claim 1 wherein a customer is prevented from loading or unloading removable media in the library through a bulk load door of the library and can only use load ports.

16. The apparatus recited in claim 14 wherein the controller assumes the bulk load door is never accessed when power is turned off and ignores accesses while the library is powered up.

17. The apparatus recited in claim 14 wherein the controller performs an inventory when the bulk load door is closed when the controller detects accesses of the bulk load door.

18. The apparatus recited in claim 1 further comprising a no inventory—do not allow media changes method for service use when a library powers up as quickly as possible, performs mechanical calibration, and does not check inventory.

19. The apparatus recited in claim 1 further comprising a no inventory—do not allow media changes method providing verification that mechanical aspects of a library are working correctly and enables the operator control panel without waiting for an inventory.

\* \* \* \* \*

UNITED STATES PATENT AND TRADEMARK OFFICE
CERTIFICATE OF CORRECTION

PATENT NO.        : 8,839,125 B2
APPLICATION NO.   : 11/259217
DATED             : September 16, 2014
INVENTOR(S)       : Curtis C. Ballard et al.

It is certified that error appears in the above-identified patent and that said Letters Patent is hereby corrected as shown below:

In The Claims

In column 5, lines 36-37, in Claim 1, delete "comprising;" and insert -- comprising: --, therefor.

In column 6, line 17, in Claim 8, delete "Inventory" and insert -- inventory --, therefor.

In column 6, line 31, in Claim 11, delete "during," and insert -- during --, therefor.

Signed and Sealed this
Tenth Day of February, 2015

Michelle K. Lee
*Deputy Director of the United States Patent and Trademark Office*